(12) United States Patent
Bowie

(10) Patent No.: US 11,689,574 B2
(45) Date of Patent: Jun. 27, 2023

(54) OPTIMIZING SECURITY AND EVENT INFORMATION

(71) Applicant: International Business Machines Corporation, Armonk, NY (US)

(72) Inventor: Dale Bowie, Benowa (AU)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 17/195,697

(22) Filed: Mar. 9, 2021

(65) Prior Publication Data

US 2022/0294826 A1    Sep. 15, 2022

(51) Int. Cl.
*H04L 9/40* (2022.01)
(52) U.S. Cl.
CPC ................... *H04L 63/20* (2013.01)
(58) Field of Classification Search
CPC ....................................................... H04L 63/20
USPC ............................................................. 726/1
See application file for complete search history.

(56) References Cited

U.S. PATENT DOCUMENTS

| 9,331,916 | B1 | 5/2016 | Kolman | |
| 2013/0254200 | A1* | 9/2013 | Sachs | G06F 16/2358 707/E17.005 |
| 2018/0293327 | A1 | 10/2018 | Miller | |
| 2020/0201856 | A1 | 6/2020 | Israel | |
| 2020/0311518 | A1 | 10/2020 | Oliner | |
| 2021/0273970 | A1* | 9/2021 | Alshech | G06K 9/6215 |
| 2021/0294903 | A1* | 9/2021 | Hicks | G06F 11/0793 |

OTHER PUBLICATIONS

"Explanation of rules", Snort, © 2020, 4 pages, <https://www.snort.org/rules_explanation>.
Kerravala, Zeus, "Zeek: A free, powerful way to monitor networks, detect threats", Oct. 15, 2018, 7 pages, <https://www.csoonline.com/article/3313050/zeek-a-free-powerful-way-to-monitor-networks-detect-threats.html>.

* cited by examiner

*Primary Examiner* — Anthony D Brown
(74) *Attorney, Agent, or Firm* — Gavin Giraud

(57) ABSTRACT

A configuration of a security system is optimized based on revising metadata categories and one or more associated properties which comprise the metadata categories included in at least one rule used by the security system. The optimized configuration is transmitted to the security system. A current configuration of the security system is update. An indication of the update being successful is received.

20 Claims, 4 Drawing Sheets

| CATEGORY | PROPERTIES |
| --- | --- |
| CLOUD | AWS ACCOUNT ID<br>AWS ACTION<br>AWS LOG STATUS |
| DNS | DNS REQUEST TYPE<br>DNS QUERY ID<br>DNS FLAGS<br>DNS DOMAIN NAME<br>DNS RESPONSE CODE<br>DNS QUERY<br>DNS RESPONSE<br>DNS ANSWERS<br>DNS RAW ANSWER |
| ENCAPSULATION | DOT1Q VLAN ID<br>DOT1Q PRIORITY<br>DOT1Q CUSTOMER VLAN ID<br>DOT1Q CUSTOMER PRIORITY<br>POST DOT1Q VLAN ID<br>POST DOT1Q CUSTOMER VLAN ID<br>DOT1Q DEI<br>DOT1Q CUSTOMER DEI<br>ENTERPRISE VLAN ID<br>CUSTOMER VLAN ID<br>VXLAN NETWORK IDENTIFIER |
| FILE | CONTENT TYPE<br>FILE HASH<br>FILE SIZE<br>FILE NAME<br>FILE ENTROPY<br>SHA256 FILE HASH<br>SHA1 FILE HASH<br>MD5 FILE HASH |
| FTP | FTP COMMAND<br>FTP REPLY CODE<br>FTP RESPONSE |

FIG. 3

OPTIMIZING SECURITY AND EVENT INFORMATION

BACKGROUND

The present invention relates generally to the field of computer security, and more particularly optimizing a security information and event management system.

A security information and event management (SIEM) system is a subsection within the field of computer security, where software products and services combine security information management and security event management. The SIEM system monitors network traffic flowing through some network segment and provides real-time analysis of security alerts generated by applications and network hardware. Further, the SIEM system can log security data and generate reports for compliance purposes. A SIEM system includes capabilities and components such as data aggregation and correlation, alerting, dashboards, compliance, retention, and forensic analysis. An SIEM system is available as software, as an "appliance", and as a managed service.

SUMMARY OF THE INVENTION

Embodiments of the present invention include an approach for optimizing a security information and event management system. In one embodiment, a configuration of a security system is optimized based on revising metadata categories and one or more associated properties which comprise the metadata categories included in at least one rule used by the security system. The optimized configuration is transmitted to the security system. A current configuration of the security system is update. An indication of the update being successful is received.

BRIEF DESCRIPTION OF THE DRAWINGS

FIG. 3 depicts an example of a partial list of metadata categories and their associated properties that can be extracted from data packets in a network flow, in accordance with an embodiment of the present invention.

DETAILED DESCRIPTION

Figure 1:
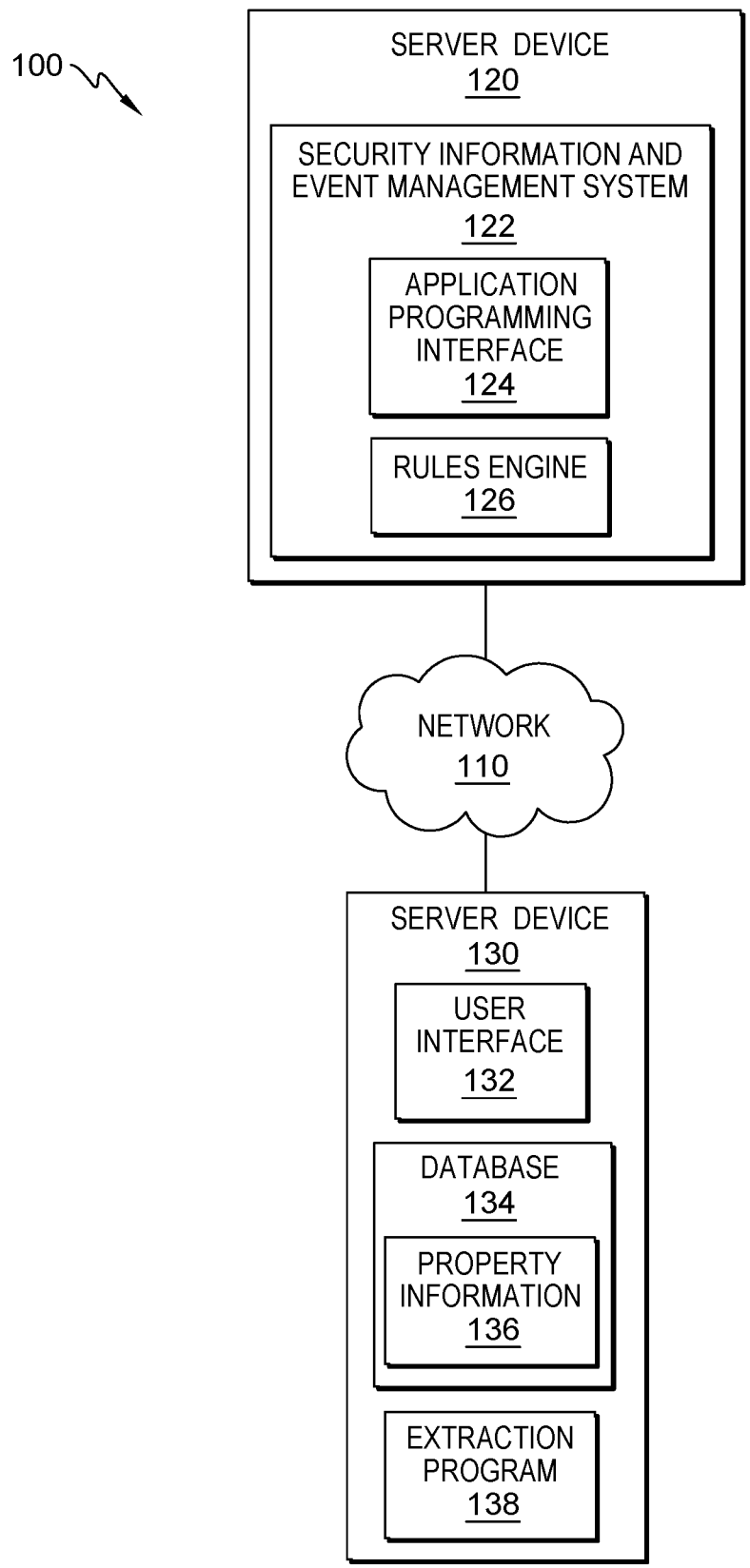
FIG. 1 depicts a functional block diagram illustrating a computing environment which includes an extraction program, in accordance with an embodiment of the present invention.

Embodiments of the present invention recognize that we live in a connected world. Examples include our work computers connected to a company's proprietary information, our smartphones connected to our financial institutions, our laptop or desktop computers connected to our physician's offices for virtual visits, and our exercise bikes, treadmills, Internet of things devices, trucks and cars connected to the Internet. Each of these connections is an opportunity for someone to take information not belonging to them and to profit on that stolen information. Systems, such as a security information and event management (SIEM) system work behind the scenes to prevent the unauthorized taking of personal information. Unfortunately, because of the massive amounts of data generated by all of these connections, real time processing of all of the data and the associated metadata is not feasible. A solution is needed that is capable of analyzing a deployment of an SIEM system and optimizing said deployment based on the intended use of the system and the actual usage data generated by the system.

Embodiments of the present invention recognize that there may be a method, computer program product, and computer system for optimizing a security information and event management system. The method, computer program product, and computer system improves the technology of the SIEM system by optimizing the properties that are extracted from information included in network data packets based on identifying the common rules (i.e., rules with common features within the rule definition of each rule) that trigger security alerts. Similarities (i.e., properties, categories of properties, etc.) are determined between the common rules. Based on the determined similarities, additional properties within the same category of metadata (i.e., additional data included in the network data packets) can be enabled to better identify potential security issues. Further, unused properties can be disabled to improve the operation of the SIEM system.

In an embodiment, a request for a set of rules is transmitted to a rules engine. In the embodiment, the set of rules and alert data is received. Further in the embodiment, the received data is analyzed. Further yet in the embodiment, a configuration request is transmitted to a security information and event management (SIEM) system. Further yet in the embodiment, configuration data is received. Further yet in the embodiment, metadata categories are determined based on the received rule and alert data and the received configuration data. Further yet in the embodiment, an optimized configuration is transmitted to the SIEM. Further yet in the embodiment, the SIEM configuration is updated. Further yet in the embodiment, an indication is received.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes server device 120 and server device 130 interconnected by network 110. In example embodiments, computing environment 100 includes other computing devices (not shown in FIG. 1) such as additional wearable technology, cell phones, smartphones, phablets, tablet computers, laptop computers, desktop computers, other computer servers, or any other computer system known in the art, interconnected with server device 120 and server device 130 over network 110.

In embodiments of the present invention, server device 120 and server device 130 are connected to network 110, which enables server device 120 and server device 130 to access other computing devices and/or data not directly stored on server device 120 and server device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between server device 120 and server device 130, and any other computing devices (not shown in FIG. 1) connected to network 110, in accordance with embodiments of the present invention.

According to an embodiment, server device 120 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 120 can be a standalone computing device, a management server, a web server, a mobile computing device, or any other electronic device or computing system capable of receiving, transmitting, and processing data. In other embodiments, server device 120 can represent computing systems utilizing multiple computers as a server system, such as in a cloud computing environment. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. According to one embodiment, server device 120 is a data aggregation and processing device. In an embodiment, computing environment 100 includes any number of server device 120. Server device 120 may include internal and external hardware components as depicted and described in further detail with respect to FIG. 3, in accordance with embodiments of the present invention. In an embodiment, server device 120 also includes security information and event management (SIEM) system 122.

In an embodiment, SIEM system 122 provides real-time analysis of security alerts generated by software applications and network hardware. SIEM system 122 is designed to provide security teams with centralized visibility into enterprise-wide security data and actionable insights into the highest priority threats. As an initial step, SIEM system 122 ingests a vast amount of data throughout the enterprise to provide a comprehensive view of activity throughout on-premises and cloud-based environments. As data is consumed, SIEM system 122 applies real-time, automated security intelligence to detect and prioritize threats quickly and accurately. Based on the actionable alerts, which provide greater context into potential incidents, SIEM system 122 enables security analysts to quickly respond and limit the impact from a security incident or breach. In an embodiment, SIEM system 122 includes application programming interface (API) 124 and rules engine 126.

According to an embodiment, API 124 is a computing interface that defines interactions between multiple software intermediaries (e.g., SIEM system 122, rules engine 126, and extraction program 138). API 124 defines the kinds of calls or requests that can be made, how to make them, the data formats that should be used, the conventions to follow, etc. API 124 can be entirely custom, specific to a component, or designed based on an industry-standard to ensure interoperability. Through information hiding, APIs such as API 124 enable modular programming, allowing users to use the interface independently of the implementation.

According to an embodiment of the present invention, rules engine 126 is a repository of correlation rules utilized by SIEM system 122. An individual correlation rule included in rules engine 126 indicates to SIEM system 122 which properties of an event or flow record, or which sequences of event or flow records might suggest a security weakness or a cyber-attack. A correlation rule found in rules engine 126 may take the form of "when 'x' and 'y', or when 'x' and 'y' and 'z' occurs, an action should be taken", where the action may be to contact a network administrator (as an example). One example of an actual correlation rule is the following: if five failed login attempts are attempted with different usernames from the same Internet Protocol (IP) address to the same application within fifteen minutes (i.e., 'x'), if that event is followed by a successful login occurring from that same IP address to any application inside the network (i.e., 'y'), warn network administrators (i.e., the action). The five login attempts could indicate a brute-force type of cyber-attack attempting an unauthorized access of the network. While incorrect login attempts are often benign, they can also be malicious and should be investigated by a security administrator.

In an embodiment, server device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 130 can be a standalone computing device, a management server, a web server, a mobile computing device, or any other electronic device or computing system capable of receiving, transmitting, and processing data. In other embodiments, server device 130 can represent computing systems utilizing multiple computers as a server system, such as in a cloud computing environment. In certain embodiments, server device 130 represents a computer system utilizing clustered computers and components (e.g., database server computers, application server computers, etc.) that act as a single pool of seamless resources when accessed by elements of computing environment 100. In general, server device 130 is representative of any electronic device or combination of electronic devices capable of executing computer readable program instructions. According to one embodiment, server device 130 is a data collection and processing device. In an embodiment, computing environment 100 includes any number of server device 130. Server device 130 may include internal and external hardware components as depicted and described in further detail with respect to FIG. 3, in accordance with embodiments of the present invention. In an embodiment, server device 130 also includes user interface (UI) 132, database 134, and extraction program 138.

According to an embodiment, UI 132 provides an interface between a user of server device 130, server device 120, and extraction program 138. UI 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. UI 132 may also be mobile application software that provides an interface between server device 130, server device 120, and extraction program 138. Mobile application software, or an "app," is a computer program designed to run on smartphones, tablet computers and other mobile devices. UI 132 enables a user of server device 130 to interact with server device 120, SIEM system 122, extraction program 138, any other programs and applications included on server device 130 (not shown in FIG. 1), and any other computing devices (not shown in FIG. 1).

In an embodiment, database 134 is storage that is written to and/or read by server device 120, SIEM system 122, extraction program 138, and any other programs and applications on server device 120 and server device 130. In one embodiment, database 134 resides on server device 130. In other embodiments, database 134 resides on server device 120, on any other device (not shown in FIG. 1) in computing environment 100, in cloud storage, or on another computing device accessible via network 110. In yet another embodiment, database 134 represents multiple storage devices within server device 130. Database 134 may be implemented using any volatile or non-volatile storage media for storing information, as known in the art. For example, database 134 may be implemented with a tape library, optical library, one or more independent hard disk drives, multiple hard disk drives in a redundant array of independent disks (RAID), solid-state drives (SSD), or random-access memory (RAM). Similarly, database 134 may be implemented with any suitable storage architecture known in the art, such as a relational database, an object-oriented database, or one or more tables. In an embodiment of the present invention, server device 120, SIEM system 122, extraction program 138, and any other programs and applications (not shown in FIG. 1) operating on server device 130 may store, read, modify, or write data to database 134. In an embodiment of the present invention, data stored to database 134 includes, but is not limited to, property data from SIEM system 122. In the embodiment, database 134 includes property information 136.

According to an embodiment of the present invention, property information 136 is a database of metadata categories and associated properties for the metadata categories in SIEM system 122. In an embodiment, extraction program 138 extracts properties from the most triggered rules (i.e., the correlation rules included in rules engine 126) from SIEM system 122. Data stored to property information 136 includes, but is not limited to, the triggered rules, the non-triggered rules, the number of times the triggered rules are triggered, and properties included in the triggered rules, the metadata categories of data associated with the triggered rules, and other properties in the metadata categories not included in the triggered rules.

In an embodiment of the present invention, extraction program 138 is a program, a subprogram of a larger program, an application, a plurality of applications, or mobile application software, which functions to optimize a security information and event management system. A program is a sequence of instructions written to perform a specific task. In an embodiment, extraction program 138 runs independently. In other embodiments, extraction program 138 depends on system software and/or other programs (not shown in FIG. 1) to execute. According to an embodiment, extraction program 138 is a cognitive system based on artificial intelligence utilizing machine learning and deep learning which analyzes current security rules and an associated in-use configuration of an SIEM system. Based on the analysis, extraction program 138 optimizes the in-use configuration, transmits the optimized configuration to the SIEM system, and updates the in-use configuration by replacing it with the optimized configuration. In one embodiment, extraction program 138 functions as a stand-alone program residing on server device 130. In another embodiment, extraction program 138 works in conjunction with other programs, applications, etc., found in computing environment 100. In yet another embodiment, extraction program 138 resides on other computing devices such as server device 120 in computing environment 100, which is interconnected to server device 130 via network 110.

According to an embodiment, extraction program 138 transmits a request to a rules engine to receive the rules associated with security alerts that have been triggered. In the embodiment, extraction program 138 receives the requested rules and the associated triggered alerts. Further in the embodiment, extraction program 138 analyzes the received data. Further yet in the embodiment, extraction program 138 transmits, to a security information and event management (SIEM) system, a request for the configuration in-use by the SIEM system. Further yet in the embodiment, extraction program 138 receives the in-use configuration from the SIEM system. Further yet in the embodiment, extraction program 138 determines common metadata categories. Further yet in the embodiment, extraction program 138 transmits an optimized configuration to the SIEM system based on the determined common metadata categories. Further yet in the embodiment, extraction program 138 updates the configuration in-use at the SIEM system. Further yet in the embodiment, extraction program 138 receives an indication.

Figure 2:
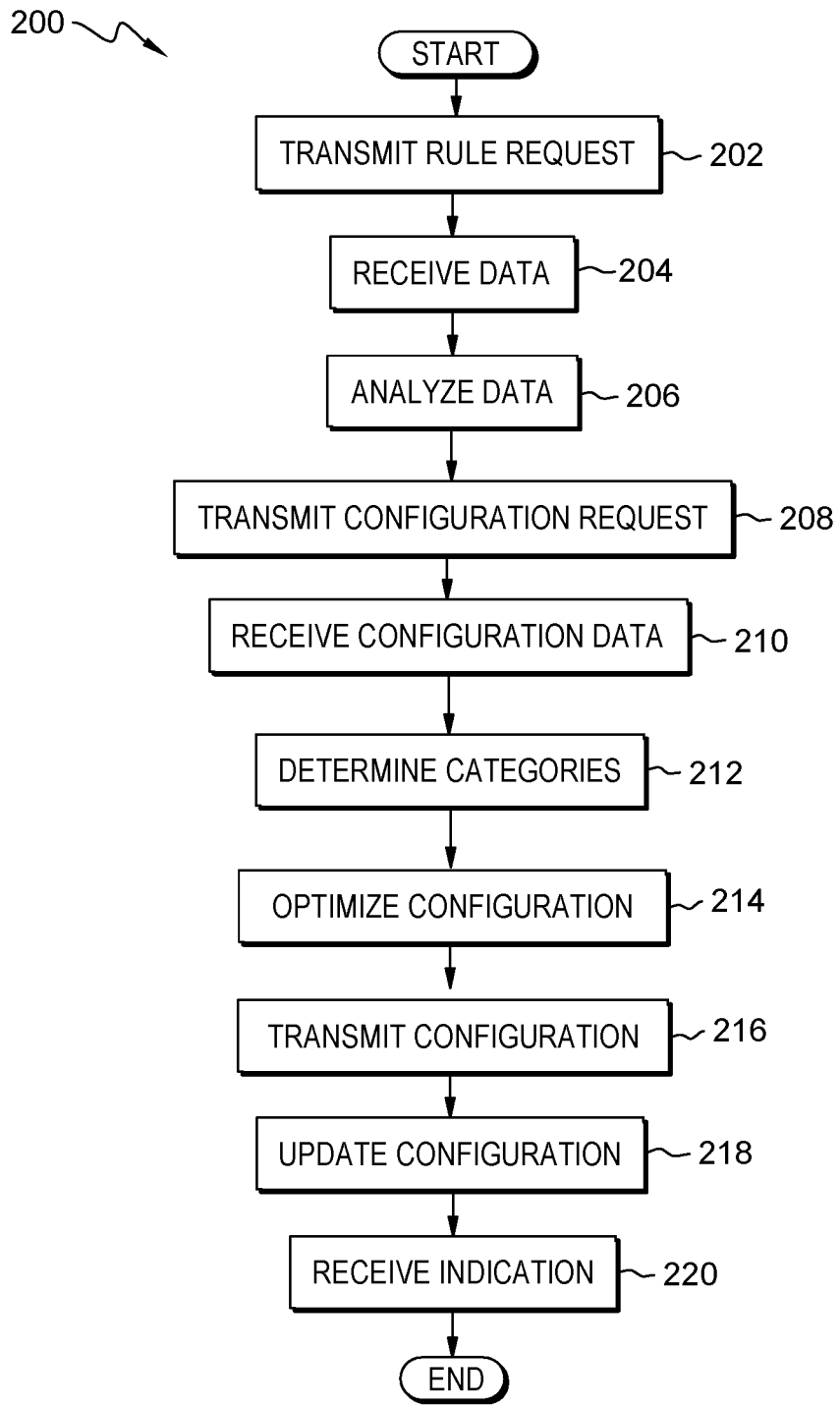
FIG. 2 is a flowchart depicting operational steps of a program for optimizing a security information and event management system, on a computing device within the computing environment of FIG. 1, in accordance with an embodiment of the present invention.

FIG. 2 is a flowchart of workflow 200 depicting operational steps for optimizing a security information and event management system. In one embodiment, the method of workflow 200 is performed by extraction program 138. In an alternative embodiment, the method of workflow 200 is performed by any other program in computing environment 100 working with extraction program 138. In an embodiment, a user of server device 130 invokes workflow 200 upon accessing extraction program 138. In another embodiment, extraction program 138 is invoked by a user of server device 120. In yet another embodiment, workflow 200 is dynamically invoked upon a triggered security alert.

In an embodiment, extraction program 138 transmits a rule request (step 202). In other words, extraction program 138 transmits a request to rules engine 126 requesting that rules engine 126 transmit rules information back to extraction program 138. According to an embodiment, rules engine 126 analyzes the usage of the correlation rules stored to rules engine 126 and determines the following information: (i) the rules that have triggered security alerts, (ii) their associated number of alerts, and (iii) the rules that have not triggered any security alerts. According to the embodiment, rules engine 126 transmits the determined information to extraction program 138 based on the received rule request from extraction program 138. In an embodiment, extraction program 138 transmits a rule request over network 110 to rules engine 126 included in SIEM system 122 on server device 120. For example, a program on a company server transmits a request to the security information and event management (SIEM) system utilized by the company; the transmission includes a request for rule usage information to be provided by the rules engine included in the SIEM system.

According to an embodiment of the present invention, extraction program 138 receives data (step 204). In other words, extraction program 138 receives rules information. In an embodiment, the rules information from rules engine 126 can include the rules that have triggered security alerts, their associated number of alerts, and the rules that have not triggered any security alerts. According to an embodiment, extraction program 138 on server device 130 receives rule usage information, transmitted by rules engine 126, over network 110. For example, the program on the company server receives the following information for the last one week period of time: Rule 1 (R1) was triggered more than once, Rule 2 (R2) was triggered more than once, Rule 3 (R3) was triggered only once, Rule 4 (R4) was not triggered, and Rule 5 (R5) is disabled.

In an embodiment, extraction program 138 analyzes data (step 206). In other words, extraction program 138 analyzes the data received from rules engine 126. According to an embodiment, the analysis by extraction program 138 determines at least how often a rule was triggered (e.g., some rules are triggered multiple times, some rules have not triggered a security alert, some rules are disabled, etc.), the specific one or more properties included in the rule, how many rules included said specific one or more properties, the one or more metadata categories associated with said specific one or more properties, other properties included in said metadata categories, and any rules that have not been triggered or enabled (and their associated metadata categories and properties). In the embodiment, extraction program 138 analyzes the received data and makes the determinations by identifying each of the rules, recognizing the one or more properties in each rule, and correlating said one or more properties to the one or more metadata categories which are stored to an accessible database. In an embodiment, extraction program 138 analyzes the data received from rules engine 126.

For example, the program on the company server analyzes each of R1 through R5, received from the SIEM system rules engine and determines the following: (i) R1 states "if 'md5 file hash' is known malware, notify administrator" and R1 was triggered almost one hundred times; (ii) R2 states "if 'md5 file hash' is known ransomware, notify administrator" and R2 was triggered several dozen times; (iii) R3 states "if 'destination Internet protocol (IP) address' has a high risk score, prevent access" and R3 was triggered only once; (iv) R4 states "if '"XYZ" action' is block, trigger an alert" and R4 was not triggered; and (v) R5 states "if '"XYZ" account identification' (ID) is 12345, trigger an alert" and R5 is disabled. Here, R1 and R2 are the most often used rules so the program identifies the property associated with both R1 and R2, namely 'md5 file hash' in the metadata category of "file". The next rule, R3, was only triggered once and is between rules that are triggered often and rules that are rarely, or not, triggered; therefore, R3 is essentially ignored by the program (i.e., no changes are made in the configuration based on R3). The next rule, R4, was not triggered in the time period and the last rule, R5, is disabled and thus not in-use.

According to an embodiment, extraction program 138 transmits a configuration request (step 208). In other words, extraction program 138 transmits a request to receive the current field configuration in-use. In an embodiment, extraction program 138 transmits the request to a field extraction application programming interface (API) endpoint such as SIEM system 122 and the API executes the instruction (i.e., request). The in-use field configuration describes the properties that are available for extraction by the API endpoint, the metadata categories associated with the properties, and whether the properties are enabled or disabled. According to an embodiment, extraction program 138 on server device 130 transmits a configuration request over network 110 to SIEM system 122 on server device 120. For example, the program on the company server sends a configuration request to the SIEM system utilized by the company.

In an embodiment, extraction program 138 receives configuration data (step 210). In other words, extraction program 138 receives the current configuration. According to an embodiment, extraction program 138 receives the current configuration from the field extraction API endpoint. The current configuration includes data such as the properties available for extraction by the API endpoint (or SIEM system), the associated metadata categories, and whether the individual properties are enabled or disabled. For a non-exhaustive list of properties and their associated metadata categories, please refer to the FIG. 3 discussion below. In an embodiment, extraction program 138 on server device 130 receives over network 110 configuration data in-use by SIEM system 122 on server device 120. For example, the program on the company server receives the following configuration data from the SIEM system used by the company: (i) property 'md5 file hash', in metadata category "file", is enabled (based on R1 and R2); (ii) property 'destination IP address', in metadata category "core properties", is enabled (based on R3); (iii) property '"XYZ" action', in metadata category "cloud", is enabled (based on R4); and (iv) property '"XYZ" account ID', in metadata category "cloud", is disabled (based on R5).

According to an embodiment, extraction program 138 determines categories (step 212). In other words, based on (i) receiving the rules data (and analyzing the same) and (ii) receiving the configuration data, extraction program 138 determines the metadata categories of properties to be enabled and disabled. In an embodiment, extraction program 138 makes the determination by correlating the metadata categories, and their associated properties, of the analyzed rules data and the configuration data. According to an embodiment, extraction program 138 on server device 130 determines the metadata categories of properties which should be enabled or disabled on SIEM system 122 on server device 120. For example, the determination by the program included on the company server yields the following results: (i) metadata category "file" in-use for R1 and R2 also includes properties 'content type' (currently disabled), 'file hash' (currently disabled), 'file size' (currently disabled), 'file name' (currently disabled), 'file entropy' (currently disabled), 'SHA256 file hash' (currently disabled), and 'SHA1 file hash (currently disabled); (ii) metadata category "core properties" in-use for R3 also includes properties 'X' (currently disabled), 'Y' (currently disabled), and 'Z' (currently disabled); and (iii) metadata category "cloud" in-use for R4 and R5 also includes property '"XYZ" log status' (currently disabled).

According to an embodiment, extraction program 138 optimizes configuration (step 214). In other words, extraction program 138 creates an optimized configuration based on the determined metadata categories. In an embodiment, extraction program 138 creates the optimized configuration by enabling all of the properties in the metadata categories where security alerts have been triggered. Not all properties are initially enabled because of performance limitations in the overall SIEM system. According to an embodiment, extraction program 138 on server device 130 optimizes the configuration program to be utilized by SIEM system 122 on server device 120. For example, the program on the company server creates an optimized configuration by enabling the following properties (which are currently disabled): (i) in the "file" metadata category, 'content type', 'file hash', 'file size', 'file name', 'file entropy', 'SHA256 file hash', and 'SHA1 file hash' are enabled; in the "core properties" metadata category, 'X', 'Y', and 'Z' are enabled; and (iii) in the "cloud" metadata category, "'XYZ" action' is changed from enabled to disabled and both "'XYZ" account ID' and "'XYZ" log status' remain disabled; this is because R4 has never been triggered and no other "cloud" metadata category properties are used in any of the enabled rules.

In an embodiment, extraction program 138 transmits configuration (step 216). In other words, extraction program 138 transmits the optimized configuration. According to one embodiment, the optimized configuration is transmitted directly to the SIEM system. According to another embodiment, the optimized configuration is transmitted to a user who determines whether the optimized configuration should be implemented. In an embodiment, extraction program 138 on server device 130 transmits the optimized configuration over network 110 to SIEM system 122 on server device 120. For example, the optimized configuration is transmitted by the program to the SIEM system utilized by the company.

According to an embodiment of the present invention, extraction program 138 updates a configuration (step 218). In other words, extraction program 138 updates the configuration of the SIEM system by replacing the current in-use configuration with the optimized configuration transmitted by extraction program 138 to the SIEM system. In one embodiment, extraction program 138 updates the configuration by dynamically replacing the in-use configuration with the optimized configuration (with all of the metadata category properties enabled). In another embodiment, extraction program 138 updates the configuration in the same manner after receiving an indication from a user who received the transmitted, optimized configuration. According to an embodiment, extraction program 138 updates the configuration of SIEM system 122 on server device 120 by replacing the in-use configuration with the optimized configuration. For example, the program on the company server automatically updates the in-use configuration by dynamically implementing the optimized configuration thus enabling all of the properties for the "file", "core properties", and "cloud" metadata categories in the SIEM system.

In an embodiment, extraction program 138 receives an indication (step 220). In other words, in response to updating the in-use configuration, extraction program 138 receives an indication of the successful update. According to an embodiment, the indication received by extraction program 138 is provided in any manner known in the art (e.g., a valid response from the SIEM system, an e-mail received by a user associated with extraction program 138, etc.). In an embodiment, extraction program 138 on server device 130 receives an indication over network 110 from SIEM system 122 on server device 120. For example, the administrator of the program on the company server receives an e-mail indicating that the configuration of the SIEM system used by the company has been revised with the updated configuration.

FIG. 3 depicts table 300, a non-exhaustive list of additional metadata categories and their associated properties which can be extracted from data packets as data flows in a network. In an embodiment, a subset of the properties are enabled for extraction by default in the SIEM system. These enabled properties are available for use in security rules and other security alerts. Through the use of extraction program 138, an SIEM system configuration can be optimized by enabling additional properties in metadata categories that are triggered often. Conversely, properties included in rules that are rarely triggered (e.g., unused) can be disabled to improve the operation of the SIEM system. Metadata categories included in table 300 (shown in column 302) include "cloud", "DNS" (i.e., domain name system), "encapsulation", "file", and "FTP" (i.e., file transfer protocol). As previously stated, this is not a complete list of metadata categories as there are many more available allowing for customization of the SIEM system. The various properties associated with each metadata category are shown in column 304 of table 300.

Figure 4:
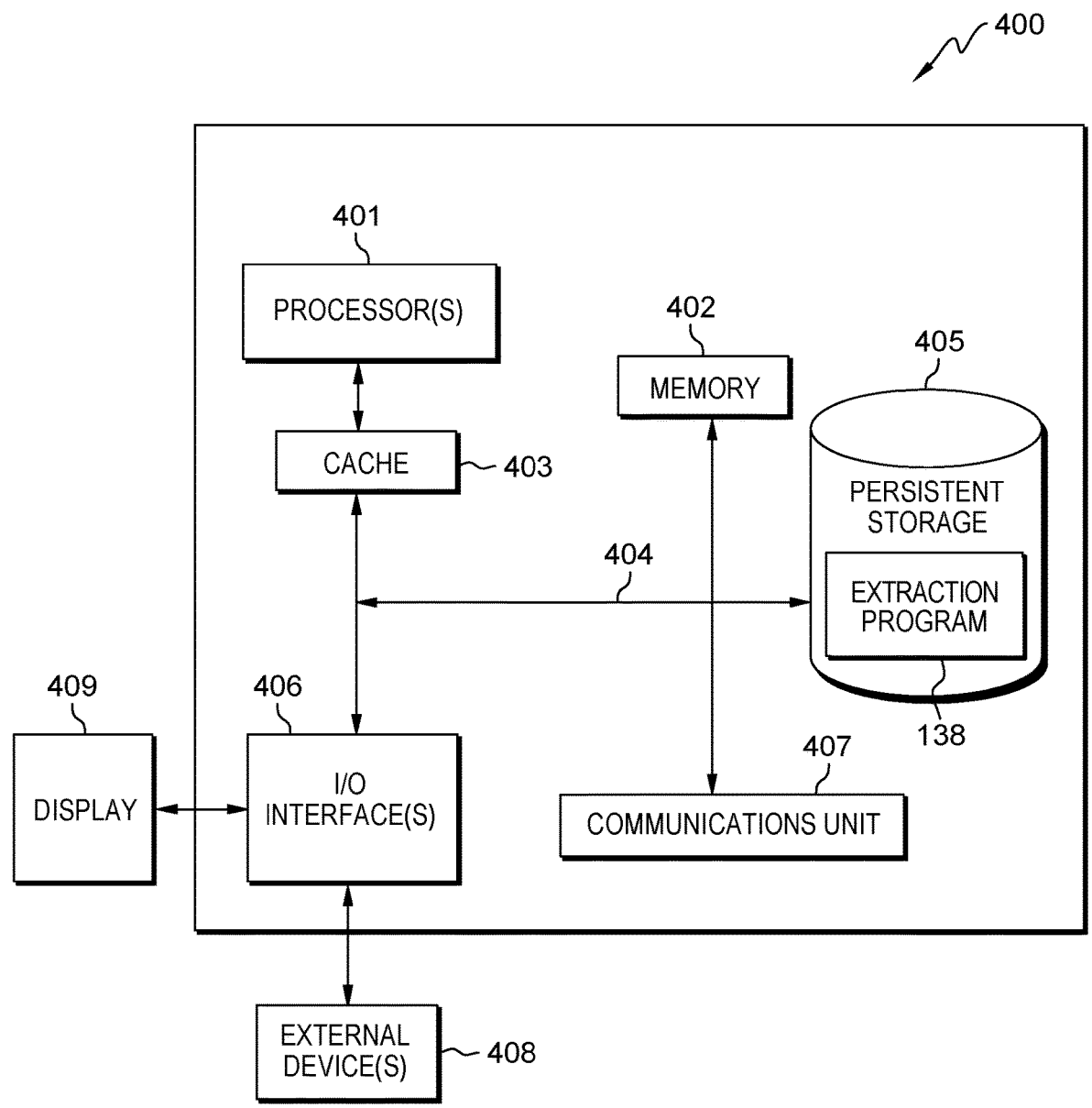
FIG. 4 depicts a block diagram of components of a computing device executing an extraction program within the computing environment of FIG. 1, in accordance with an embodiment of the present invention.

FIG. 4 depicts computer system 400, which is an example of a system that includes extraction program 138. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. PO interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
    receiving, by one or more processors, a current configuration of a security system describing: (i) properties available for extraction from at least one rule used by the security system, (ii) metadata categories associated with the properties, and (iii) which of the properties are enabled;
    revising the metadata categories and one or more associated which of the properties are enabled to determine a new configuration;
    transmitting, by one or more computer processors, the new configuration to the security system;
    updating, by one or more computer processors, a current configuration of the security system based on the new configuration; and
    receiving, by one or more computer processors, a first indication of the update being successful.

2. The method of claim 1, wherein the step of updating, by one or more computer processors, a current configuration of the security system, comprises:
    dynamically replacing, by one or more computer processors, the current configuration of the security system with the new configuration.

3. The method of claim 1, further comprising:
    transmitting, by one or more computer processors, a request to a rule engine of the security system;
    receiving, by one or more computer processors, a set of rules data from the rule engine;
    analyzing, by one or more computer processors, the received set of rules data;
    transmitting, by one or more computer processors, a configuration request to the security system;
    determining, by one or more computer processors, metadata categories and associated properties to be enabled and disabled; and
    optimizing, by one or more computer processors, the current configuration based on the determined metadata categories and associated properties.

4. The method of claim 3, wherein the step of analyzing, by one or more computer processors, the received rules data, comprises:
    determining, by one or more computer processors, how often a first rule in the received set of rules data triggers a security alert;
    determining, by one or more computer processors, one or more properties included in the first rule;
    determining, by one or more computer processors, additional rules in the received set of rules data which include the determined one or more properties included in the first rule;
    determining, by one or more computer processors, one or more metadata categories associated with (i) the determined one or more properties included in the first rule and (ii) the additional rules;
    determining, by one or more computer processors, additional properties included in the determined one or more metadata categories;
    determining, by one or more computer processors, a first group of rules that have not triggered any security alerts;
    determining, by one or more computer processors, a second group of rules that are disabled; and
    determining, by one or more computer processors, the metadata categories and associated properties included in the first group and the second group of rules.

5. The method of claim 3, wherein the step of determining, by one or more computer processors, metadata categories of properties to be enabled and disabled, comprises:
    correlating, by one or more computer processors, a first set of metadata categories, and their respective properties, included in the analyzed set of rules data with a second set of metadata categories, and their respective properties, included in the received set of current configuration data;
    enabling, by one or more computer processors, currently disabled properties for rules and their associated metadata categories which have triggered one or more security alerts; and
    disabling, by one or more computer processors, currently enabled properties for rules and their associated metadata categories which have not triggered one or more security alerts.

6. The method of claim 3, wherein the set of rules data from the rule engine comprises a first subset of rules that have triggered one or more security alerts and a second subset of rules that have not triggered one or more security alerts.

7. The method of claim 1, wherein the configuration of the security system comprises one or more properties available for extraction, at least one metadata category associated with each of the one or more properties, and a second indication whether each property in the one or more properties is currently enabled or disabled.

8. A computer program product, the computer program product comprising:
    one or more computer readable storage media; and
    program instructions stored on the one or more computer readable storage media, the program instructions comprising:
        program instructions to receive a current configuration of a security system describing: (i) properties available for extraction from at least one rule used by the security system, (ii) metadata categories associated with the properties, and (iii) whether the properties are enabled or disabled;

program instructions to revise the metadata categories and the enabling or disabling of the properties to determine a new configuration;
program instructions to transmit the new configuration to the security system;
program instructions to update a current configuration of the security system based on the new configuration; and
program instructions to receive a first indication of the update being successful.

9. The computer program product of claim 8, wherein the program instructions to update a current configuration of the security system, comprises program instructions to:
dynamically replace the current configuration of the security system with the new configuration.

10. The computer program product of claim 8, further comprising program instructions stored on the one or more computer readable storage media, to:
transmit a request to a rule engine of the security system;
receive a set of rules data from the rule engine;
analyze the received set of rules data;
transmit a configuration request to the security system;
determine metadata categories and associated properties to be enabled and disabled; and
optimize the current configuration based on the determined metadata categories and associated properties.

11. The computer program product of claim 10, wherein the program instructions to analyze the received set of rules data, comprises:
program instructions to determine how often a first rule in the received set of rules data triggers a security alert;
program instructions to determine one or more properties included in the first rule;
program instructions to determine additional rules in the received set of rules data which include the determined one or more properties included in the first rule;
program instructions to determine one or more metadata categories associated with (i) the determined one or more properties included in the first rule and (ii) the additional rules;
program instructions to determine additional properties included in the determined one or more metadata categories;
program instructions to determine a first group of rules that have not triggered any security alerts;
program instructions to determine a second group of rules that are disabled; and
program instructions to determine the metadata categories and associated properties included in the first group and the second group of rules.

12. The computer program product of claim 10, wherein the program instructions to determine metadata categories and associated properties to be enabled and disabled, comprises:
program instructions to correlate a first set of metadata categories, and their respective properties, included in the analyzed set of rules data with a second set of metadata categories, and their respective properties, included in the received set of current configuration data;
program instructions to enable currently disabled properties for rules and their associated metadata categories which have triggered one or more security alerts; and
program instructions to disable currently enabled properties for rules and their associated metadata categories which have not triggered one or more security alerts.

13. The computer program product of claim 10, wherein the set of rules data from the rule engine comprises a first subset of rules that have triggered one or more security alerts and a second subset of rules that have not triggered one or more security alerts.

14. The computer program product of claim 8, wherein the configuration of the security system comprises one or more properties available for extraction, at least one metadata category associated with each of the one or more properties, and a second indication whether each property in the one or more properties is currently enabled or disabled.

15. A computer system, the computer system comprising:
one or more computer processors;
one or more computer readable storage media; and
program instructions stored on the one or more computer readable storage media for execution by at least one of the one or more computer processors, the program instructions comprising:
program instructions to receive a current configuration of a security system describing: (i) properties available for extraction from at least one rule used by the security system, (ii) metadata categories associated with the properties, and (iii) whether the properties are enabled or disabled;
program instructions to revise the metadata categories and the enabling or disabling of the properties to determine a new configuration;
program instructions to transmit the new configuration to the security system;
program instructions to update a current configuration of the security system based on the new configuration; and
program instructions to receive a first indication of the update being successful.

16. The computer system of claim 15, wherein the program instructions to update a current configuration of the security system, comprises program instructions to:
dynamically replace the current configuration of the security system with the new configuration.

17. The computer system of claim 15, further comprising program instructions stored on the one or more computer readable storage media for execution by at least one of the one or more computer processors, to:
transmit a request to a rule engine of the security system;
receive a set of rules data from the rule engine;
analyze the received set of rules data;
transmit a configuration request to the security system;
determine metadata categories and associated properties to be enabled and disabled; and
optimize the current configuration based on the determined metadata categories and associated properties.

18. The computer system of claim 17, wherein the program instructions to analyze the received set of rules data, comprises:
program instructions to determine how often a first rule in the received set of rules data triggers a security alert;
program instructions to determine one or more properties included in the first rule;
program instructions to determine additional rules in the received set of rules data which include the determined one or more properties included in the first rule;
program instructions to determine one or more metadata categories associated with (i) the determined one or more properties included in the first rule and (ii) the additional rules;

program instructions to determine additional properties included in the determined one or more metadata categories;
program instructions to determine a first group of rules that have not triggered a security alert;
program instructions to determine a second group of rules that are disabled; and
program instructions to determine the metadata categories and associated properties included in the first group and the second group of rules.

19. The computer system of claim 17, wherein the program instructions to determine metadata categories and associated properties to be enabled and disabled, comprises:
program instructions to correlate a first set of metadata categories, and their respective properties, included in the analyzed set of rules data with a second set of metadata categories, and their respective properties, included in the received set of current configuration data;
program instructions to enable currently disabled properties for rules and their associated metadata categories which have triggered one or more security alerts; and
program instructions to disable currently enabled properties for rules and their associated metadata categories which have not triggered one or more security alerts.

20. The computer system of claim 17, wherein the set of rules data from the rule engine comprises a first subset of rules that have triggered one or more security alerts and a second subset of rules that have not triggered one or more security alerts.

* * * * *